US006571212B1

(12) United States Patent
Dent (10) Patent No.: US 6,571,212 B1
(45) Date of Patent: May 27, 2003

(54) MOBILE INTERNET PROTOCOL VOICE SYSTEM

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 520 days.

(21) Appl. No.: 09/639,191

(22) Filed: Aug. 15, 2000

(51) Int. Cl.[7] .......................... G10L 19/00; H04L 12/64
(52) U.S. Cl. ..................... 704/270.1; 704/270; 455/439
(58) Field of Search ............................ 704/270, 270.1, 704/500; 379/88.17; 455/437, 439; 370/489

(56) References Cited

U.S. PATENT DOCUMENTS

| | | | |
|---|---|---|---|
| 5,953,666 A | 9/1999 | Lehtimaki ................. | 455/439 |
| 6,252,910 B1 * | 6/2001 | West et al. ............... | 375/261 |
| 6,343,086 B1 * | 1/2002 | Katz et al. ............... | 370/489 |
| 6,411,806 B1 * | 6/2002 | Garner et al. ............ | 455/428 |

FOREIGN PATENT DOCUMENTS

| WO | WO 98/12893 | 3/1998 |
|---|---|---|
| WO | WO 99/05830 | 2/1999 |

OTHER PUBLICATIONS

Fabri, S.N.; Kondoz, A,; Tatesh, S.; Demetrescu, C.; "Proposed evolution of GPRS for the support of voice services," IEE Proc.–Commun vol. 146, No. 5, Oct. 1999, pp. 325–330.

Hansen, Harri; "Ipsec and Mobile–IP in Mobile Ad Hoc Networking," Seminar Presentation on the Hut Course TIK–110.551 Internetworking, May 25, 2000.

* cited by examiner

Primary Examiner—Susan McFadden
(74) Attorney, Agent, or Firm—Coats & Bennett, P.L.L.C.

(57) ABSTRACT

A system for Internet Protocol voice communication comprises using both the Internet and wireless communications systems to communicate between two individuals. The speech is encrypted and encoded prior to transmission with an error indication field appended to the speech bits. Formatting for the Internet leg of the communications occurs according to Internet Protocol. Errors arising during the wireless transmission are addressed by appropriately ordering the encryption, error correction coding, and error detection together with the appended error indication field.

56 Claims, 7 Drawing Sheets

MOBILE INTERNET PROTOCOL VOICE SYSTEM

BACKGROUND OF THE INVENTION

The present invention relates to communication systems and protocols for voice communications and, more particularly, to a communication system and protocol for transmitting and receiving voice calls over the Internet where at least one terminal is a mobile terminal.

Mobile wireless communications have evolved into a well-established field with numerous industry standards for both analog and digital communication systems. In digital wireless communication systems, undue degradation to the voice quality can be substantially prevented even though the digital data suffers from uncorrected transmission errors. For example, in British Patent No. 8,119,215 to Applicant, a method of detecting errors in frequency-hopping transmissions of digital voice data is described, wherein the data from hops determined to be in error is replaced by data deemed not to be in error. The new data preferably corresponds to the voice signal one or more whole pitch periods earlier or later in time. Since the introduction of this technology, digital mobile communication systems have employed bad-data replacement to maintain the highest possible voice quality under marginal radio conditions. Such methods are variously known as "deburping," or more scientifically, as "artificial parameter reconstruction" (APR). The detection of uncorrected errors and their handling by APR typically occurs immediately upon reception. Moreover, the compressed digital voice formats used for wireless transmission are generally converted to standard Pulse Coded Modulation (PCM) or analog voice waveforms for further transmission over the telephone network.

In prior art digital mobile communication systems, it is also known to use digital encryption over the wireless communication link, which is otherwise too easily intercepted. A user specific encryption key is typically established for each call at the mobile terminal and at the base station serving as the present host for the mobile terminal. The encrypted data transmitted from the mobile terminal is then deciphered at the base station so that it is possible to manipulate the plain text voice bits in the APR algorithm. After deciphering, the base station may pass the call to the Public Switched Telephone Network (PSTN) so that the intended recipient may receive the call. The transmission over the PSTN or other wire-based network is generally unencrypted. Consequently, communications remain vulnerable to interception on the PSTN or other wire-based network. In theory, such interception is only legally possible by law enforcement agencies, but there are no safeguards against illegal interception. Thus, sensitive information may actually be better protected during a wireless transmission than a wire-based transmission.

With increasing amounts of sensitive financial, personal, technical, and business information being transmitted over the Internet, there will be increased concern for security and greater use of encryption. Imminent changes to government policy are likely to sacrifice access by law enforcement agencies to wire-based networks for the greater benefits of security in general, thus encouraging more encryption on wire-based networks. An initiative promoting this attitude is known as Safety and Freedom through Encryption, or SAFE for short. However, to date, there has been no real effort to provide mass encryption of communications over wire-based networks.

Another recent development is the use of the Internet for voice calls, known in the industry as "IP voice." Since Internet access is essentially a subscription-charge-only service, with no usage charge for minutes or long distance, this arrangement is attractive to subscribers. To date, IP voice has only been used for calls between fixed subscribers, i.e., those connected to wire-based networks.

Mobile subscribers can be connected to fixed subscribers using IP voice. However, the protocol over the wireless communication link is normally the standard circuit-switched wireless protocol. Conversion to Internet Protocol (IP) is done at a wireless network station, such as a base station. In the future, mobile communication systems known as third generation mobile communication systems will allow the Internet Protocol (IP) to be extended over the wireless link. For example, GSM's General Packet Radio Service (GPRS) and a development thereof known as EDGE, are currently being planned and implemented. IP is an end-to-end protocol. The transport mechanism is, in principle, a bit-exact transport mechanism, meaning that the protocol ensures that all bits are transmitted correctly. If encryption is used, it is end-to-end encryption. It will be appreciated that, if traffic is end-to-end encrypted, it is impossible for the wire-based network to determine whether a given quantity of bits represents speech or computer data, and therefore, it is impossible to have differential pricing. Likewise, it may be difficult to perform APR in the mobile communication network, which requires modification of plain text data.

To date, IP voice is in an embryonic stage of development that has been conceived for calls between fixed terminals, without taking into account the specific needs of wireless communications and the implication of bit-exact protocols or end-to-end encryption. Thus, there is a need for an IP voice protocol that accommodates wireless communication and end-to-end encryption and that is compatible with existing mobile communication technologies.

BRIEF SUMMARY OF THE INVENTION

The present invention overcomes the disadvantages of prior art IP voice networks by accommodating the needs for wireless communications while still allowing end-to-end encryption. According to the present invention, when a digital speech signal is formatted for transmission over a wireless communication link, a blank field, referred to herein as an error indication field, is appended to each speech data packet. The bits of the error indication field are initially set to a value indicative of no error. The speech bits and error indication bits in the speech data packet are then separately encrypted, for example, by bit-wise encryption. Error correction and error detection coding are performed following encryption. By performing error coding after encryption, it is possible to detect errors at the receiving end without first decrypting the message. Also, the use of bit-wise encryption allows bits in the error indication field to be inverted to give an error indication without decrypting the message. Thus, the present invention allows the error indication to be added to an already-encrypted message without altering the total number of bits contained in the message. The ability to add an error indication to an already-encrypted message without changing the total number of bits allows use of end-to-end encryption and other end-to-end protocols, such as the Internet Protocol (IP), without causing protocol stack violations.

In one embodiment, a system for transmitting speech from a fixed terminal to a mobile terminal is disclosed.

Analog speech is received at a fixed terminal, converted to a digital signal, and then turned into speech bits by a vocoder. The speech bits are transmitted in a speech frame having an error indication field. The bits of the error indication field are initially set to a default value indicative of no error. The speech bits and error indication bits are encrypted, preferably with bitwise encryption technology, to generate an encrypted speech signal. The encrypted speech signal is then formatted for transmission over the Internet to a wireless base station. The wireless base station strips the Internet formatting from the message and performs error detection coding and error correction coding on the encrypted speech signal. Then, the base station formats a message for transmission over the wireless communication link to the mobile terminal. The mobile terminal receives and demodulates the message, and then performs error correction and detection decoding on the still-encrypted signal. An error indication is generated. The resulting speech bits and error indication field are then decrypted and passed to a vocoder prior to digital-to-analog conversion for emission through a speaker on the mobile terminal.

In another embodiment, a system for transmitting voice from a mobile terminal to a fixed terminal or another mobile terminal is disclosed. A vocoder in the mobile terminal digitizes and codes speech. An error indication field is appended to the speech bits output by the vocoder. An encoder in the mobile terminal performs error detection and error correction encoding on the speech bits and error indication bits to protect against wireless transmission errors. A transmitter formats the encoded bits for transmission to a base station. A base station receiver receives the transmitted packets, decodes the error correction and error detection codes, and determines if a transmission error occurred. If an error is detected, the bits in the error indication field are altered to give an error indication. The base station then reformats the decoded data, including the bits in the error indication field, for onward transmission over the Internet.

The invention further comprises a terminal for receiving digital data packets including an error indication. The terminal processes the received digital data packets to reformat them for input to a vocoder. If the error indication field contains an indication of no error, the speech bits are processed normally by the vocoder. If the error indication field contains an indication of error, alternative processing, such as Artificial Parameter Reconstruction, is used to mask or conceal the erroneous data.

In a further aspect of the invention, a wireless base station for transmitting voice over a wireless communications link to a mobile terminal is provided. The base station receives the digital voice messages as packet data over the Internet. The messages may originate at either a fixed terminal or a mobile terminal. The data packets include an error indication field. The wireless base station reformats the digital voice messages for wireless transmission to the mobile terminal and performs error correction and error detection coding. The intended mobile terminal receives the reformatted data, error decodes the message and uses the error detection code to determine the presence or absence of wireless transmission errors. If the error detection code indicates the presence of uncorrected transmission errors, the mobile terminal reformats the received data to replace erroneous data with other data. Alternatively, if the error detection code indicates no uncorrected errors, but the decoded blank field is indicative of errors occurring nearer the source, the mobile terminal also replaces the erroneous data. If the data is not erroneous, non-erroneous data and replaced erroneous data are passed to a voice decoder for reconstructing the voice signal.

In yet another implementation of the invention, a base station is provided for transmitting digital voice data received over the Internet, or other fixed voice network, to a mobile terminal or a fixed terminal. An error indication field that is used to provide an error indication is appended to the voice data. The base station performs error detection and error correction coding and reformats the message for transmission to the mobile terminal. Data determined to be in error by the base station may optionally be replaced by other data before onward transmission to the mobile terminal. This may occur, for example, when the message is received at the base station from a mobile terminal. At the receiving mobile terminal, error correction decoding and error detection are performed. If uncorrected wireless transmission errors are detected, the erroneous data is replaced by other data.

Another aspect of the invention relates to the provision of end-to-end encryption of voice messages over the Internet when at least one subscriber is using a mobile terminal. Voice for transmission from a mobile terminal is converted to a digital bitstream by a vocoder, and an error indication field containing at least one error indication bit is appended. The digital bitstream is then encrypted independently of the error indication field, which may or may not be separately encrypted, by addition of an encryption sequence calculated from a secret key. The encrypted speech bits and the error indication bits are then protected by error correction and error detection encoding, including possible unequal error protection in dependence on an importance-ranking of the bits, and formatted into packets for transmission to a wireless base station. At the wireless base station, the received packets are error correction decoded and the error detection code is processed to indicate the presence or absence of uncorrected wireless transmission errors. If uncorrected wireless transmission errors are indicated, the error indication field is modified by inverting at least one error indication bit. The decoded data packets, including the modified error indication field, are then transmitted over the Internet to a fixed subscriber or to another wireless base station and thence to another wireless subscriber. The receiving terminal receives, decodes, and decrypts the transmitted packets including the error indication field using the same secret key. If the error indication field indicates wireless transmission errors, the decrypted digital voice data containing the errors is replaced by other data computed from current, past, or future non-erroneous data.

DETAILED DESCRIPTION OF THE PREFERRED EMBODIMENTS

Figure 1:
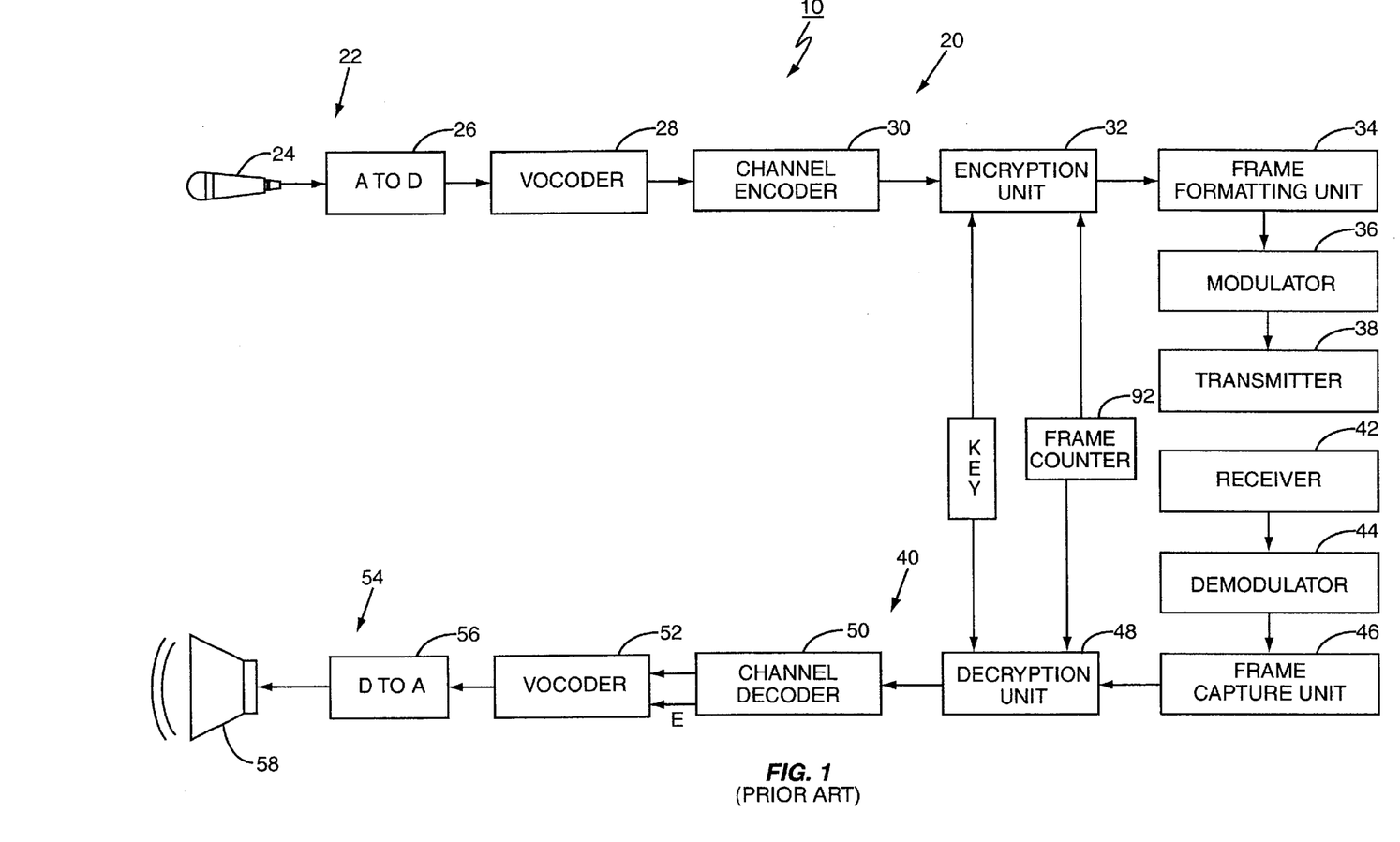
FIG. 1 is a schematic diagram of a prior art mobile terminal used for voice communications.

Turning now to the drawings, FIG. 1 shows, in simplified form, a digital mobile terminal 10. The mobile terminal 10 comprises a transmit chain 20 and a receive chain 40. The transmit chain 20 comprises a voice input 22, vocoder 28, channel encoder 30, encryption unit 32, frame formatting unit 34, modulator 36, and transmitter 38. The receive chain 40 comprises a receiver 42, demodulator 44, frame capture unit 46, decryption unit 48, channel decoder 50, vocoder 52, and output 54.

Referring to transmit chain 12, the voice input 22 may, for example, comprise a microphone 24 to produce an analog voice signal and an analog to digital (A/D) converter 26 to convert the analog voice signal to digital form. Microphone 24 translates sounds to electrical analog signals that are then input to the A/D converter 26. A/D converter 26 converts the analog speech signal to numerical form to produce a digital speech signal. A/D converter 26 generally employs a first conversion to a high bitrate delta or sigma-delta representation followed by a digital downsampling to an eight kilosamples per second, 16-bit linear Pulse Code Modulation (PCM) representation. Such a method is described in U.S. Pat. No. 5,727,023 to Applicant, which is hereby incorporated by reference. The digital speech signal is then processed numerically by vocoder 28 to reduce the bitrate as far as possible for transmission while maintaining adequate voice quality. Many complex techniques exist for compressing speech bitrates while retaining intelligibility, some of which are described in the following U.S. patents, which are incorporated by reference, namely U.S. Pat. Nos. 4,622,680; 4,776,014; 4,980,916; 5,060,269; 5,193,140; 5,214,706; 5,233,659; 5,351,338; 5,553,191; 5,842,160; 5,970,442; and 5,105,464.

Vocoders 28 used in mobile terminals 10 are generally of the source-filter type, which attempt to represent speech as one of a number of predetermined source waveforms passed through a filter, the frequency response of which is defined by a number of filter parameters. In a type of vocoder 28 known as a multi-pulse vocoder, the source waveforms are described by the positions of excitation pulses to be reproduced by a pulse generator. In another type of vocoder 28 called a "codebook excited" vocoder, the predetermined source waveforms are stored digitally in a memory known as the "codebook." The filter parameters may also be described in a variety of ways, including the frequency response or energy level at specified sub-band filter center frequencies, linear prediction coefficients (LPC), filter reflection coefficients, or "log-area-ratios."

Vocoder 28 outputs coded speech frames which comprise a plurality of speech bits. The speech frames are input to the channel encoder 30 which encodes the speech frame using error correction and/or error detection codes. The purpose of error coding is to enable the receiver to detect and correct bit errors that may occur during transmission. Channel encoder 30 facilitates the encoding methodology used in the particular system.

Whenever speech bitrates are compressed by removing redundancy, the remaining bits are more critical and may need to be protected from errors in transmission. This is particularly important for wireless communications. It is known that some speech bits may need greater protection using error correction coding than others, and that error detection coding may be used to indicate when error correction has failed to correct transmission errors. Both techniques are described for example in U.S. Pat. No. 5,073,940.

Also, U.S. Pat. Application Ser. No. 08/943,885 to Applicant, filed Oct. 3, 1997 entitled "Method for Protecting Important Data Bits Using Less Important Data Bits" describes an error coding method that provides unequal error protection for different speech bits depending upon their importance as well as error detection. The above patent and patent application are hereby incorporated by reference.

Before or after error coding, the speech frame may be protected from interception by encryption. In the digital cellular standard known as the Global System for Mobile Communications (GSM), bitwise encryption is performed in an encryption unit 32 after error coding by the channel encoder 30. Using bitwise encryption is essential when encryption is applied after error coding to avoid magnifying the number of transmission errors that appear after decryption at the receiving terminal. Using bitwise encryption, one transmission error maps to one bit error after decryption. With block encryption methods, on the other hand, a change in one bit error in a block input to the decryption unit 48 of the mobile terminal 10 results, on average, in fifty percent of the output bits being erroneous. Bitwise encryption involves generating a pseudorandom encryption bitstream, called the keystream, from an agreed upon secret key previously established in common between a transmitter and a receiver, which may occur during an authentication process as described for example in U.S. Pat. Nos. 5,091,942 and 5,594,795, both of which are incorporated by reference.

After encryption, the speech frame is formatted for transmission by frame formatting unit 34. Frame formatting unit 34 interleaves encrypted bits in the speech frame passed to it by the encryption unit 32, adds necessary synchronization and training bits, and assigns the resulting formatted bits to appropriate timeslots of a TDMA frame structure. Modulator 36 impresses the resulting formatted bits to an assigned radio frequency carrier for transmission by the transmitter 38.

Alternatively, formatting for transmission may involve spectral-spreading the bits in a speech frame using an assigned CDMA access code. In CDMA systems, it may be advantageous to reverse the order of channel coding and encryption, for example, as described in U.S. Pat. No. 5,353,352, which is hereby incorporated by reference. This enables the speech frames transmitted from any mobile terminal 10 to be decoded by an unintended receiver 42 to perform interference subtraction, without revealing the private information, as disclosed in U.S. Pat. Nos. 5,151,919 and 5,218,619, which are hereby incorporated by reference. Interference subtraction may also be effected in systems employing little or no CDMA spreading, as described in U.S. Pat. No. 5,764,646, which is also incorporated by reference.

Still with reference to FIG. 1, speech signals transmitted from a base station 60 (FIG. 2) are received by receiver 42. Receiver 42 filters, amplifies, samples, and converts the received signals to numerical samples suitable for digital processing. Demodulator 44 demodulates the received signal. The demodulated bits are then input to frame capture unit 46. The demodulator 44 preferably outputs "soft" bits rather than "hard decisions." Soft bits indicate the most likely bit polarity and the probability that the bit polarity is correct. After demodulation, the frame capture unit 46 strips off synchronization bits and training bits added by frame formatting unit 34 and de-interleaves the demodulated bits. In the absence of any errors, the bits entering the decryption unit 48 would be the same as the encrypted bits entering frame formatting unit 34 at the transmitting end. However, in practice some bit errors are expected.

Decryption unit 48 (the counterpart to encryption unit 32) decrypts the demodulated bits received from the frame capture unit 46 by bitwise subtraction of the same keystream used for encryption at the transmitting end. The bitwise subtraction is applied to the soft bit polarity but does not change the probability indications for the soft bits. A frame counter 92 provides varying input to the encryption unit 32 and decryption unit 48 so that the keystreams that they produce will not repeat for a long time, e.g., at least for the duration that a secret key is in use.

The decrypted soft bits output from decryption unit 48 are decoded by channel decoder 50. Channel decoder 50 performs error correction and error detection decoding. Various methods of error correction and error detection decoding are described in U.S. Pat. Nos. 5,577,053 and 5,910,182, both of which are hereby incorporated by reference. Channel decoder 50 uses its error detection capability to detect errors in at least certain critical bits in the digital speech signal known as "class I" bits which are unable to be corrected by the error correction codes, and generates an error indication, labeled "E" in FIG. 1, in the event an error is detected. In a mobile communication system, it will be appreciated that no amount of error correction can prevent errors when the signal has temporarily faded to zero. This error indication E is passed, along with the decoded bits from the channel decoder 50, to vocoder 52. Vocoder 52 performs Artificial Parameter Reconstruction (APR) when the error indicator E indicates uncorrected errors. In addition to the method of repeating the use of previous data disclosed in the above-referenced British patent, which is hereby incorporated by reference, numerous methods are disclosed in the art for concealing errors so as to avoid the generation of unpleasant sounds or "artifacts" by the vocoder 52. These methods are described in the following U.S. Pat. Nos. 5,097,507; 5,598,506; 5,732,356; 5,596,678; 5,572,622; 5,502,713; 5,384,793; and 5,710,781, which are incorporated herein by reference. Having replaced erroneous data in the digital speech signal or otherwise concealed the errors, the vocoder 52 typically outputs a 16-bit linear PCM signal at a rate of eight kilosamples per second. Bits output from vocoder 52 are input to D/A converter 56 to construct an analog speech signal for driving speaker 58 which, hopefully, is a close facsimile of the original speech signal generated by microphone 24.

Figure 2:
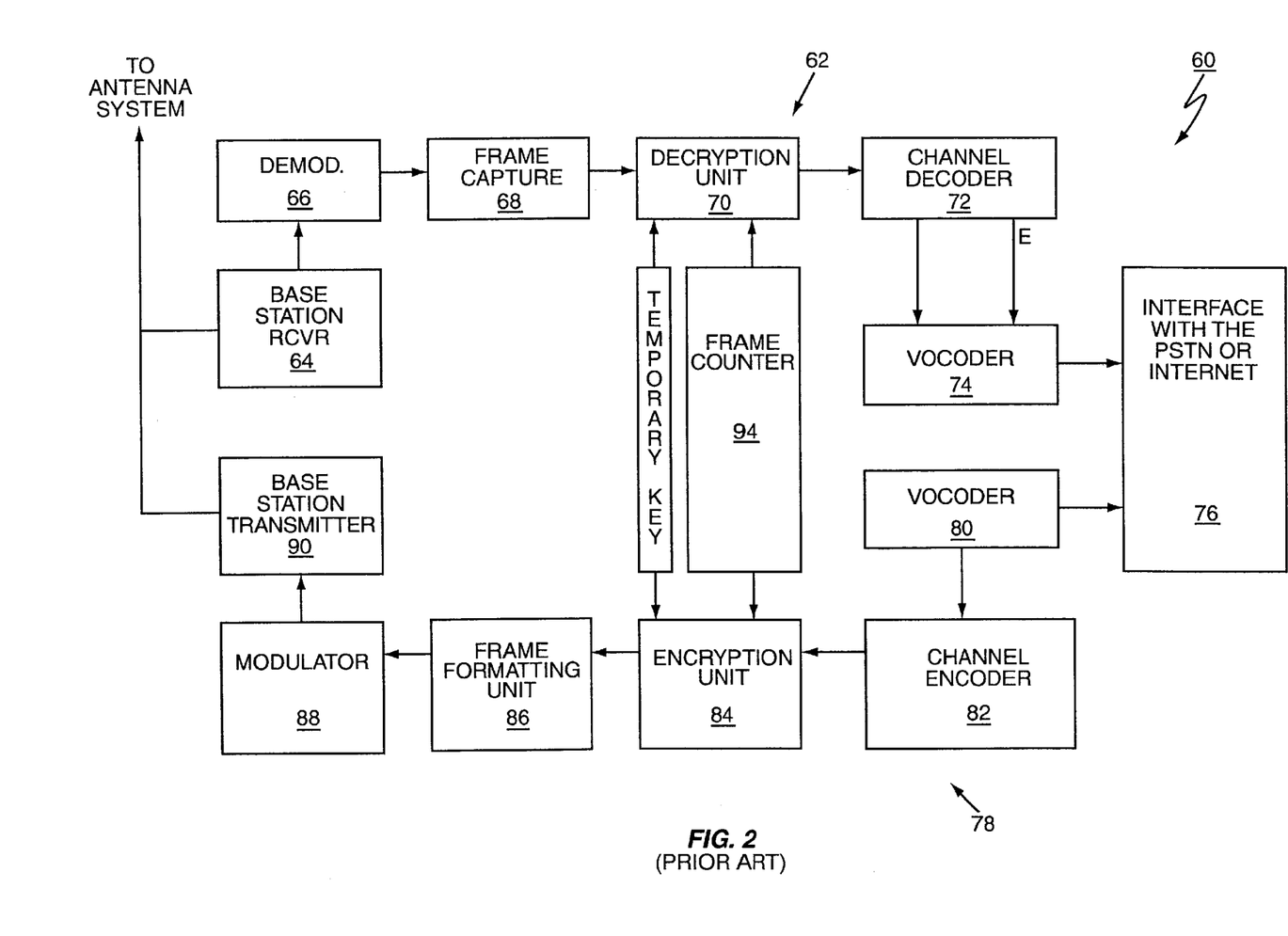
FIG. 2 is a schematic diagram of a prior art base station used for voice communications.

FIG. 2 is a block diagram of a prior art digital cellular base station 60. Base station 60 comprises a receive chain 62, a transmit chain 78, and a network interface 76 to interface the base station 60 with the Public Switched Telephone Network (PSTN), Internet, or other voice network. The receive chain 62 comprises a base receiver 64, demodulator 66, frame capture unit 68, decryption unit 70, channel decoder 72, and vocoder 74. The transmit chain 78 comprises channel encoder 82, encryption unit 84, frame formatting unit 86, modulator 88, and transmitter 90.

Base receiver 64 receives, filters, and amplifies the received signal, which is then passed to an assigned demodulator 66. The assigned demodulator 66 demodulates the signal received by the base receiver 64. Base receiver 64 may differ from the receiver 42 in a mobile terminal 10 because base stations 60 typically must receive more than one signal. Demodulator 66 may be one of a bank or pool of demodulators 66 available at the base station 60 to be assigned to process different received signals. Otherwise, operation is similar to the demodulator 44 of mobile terminal 10. Frame capture unit 68 deinterleaves the demodulated bits and strips off synchronization and timing bits. Decryption unit 70 deciphers the bits from the frame capture unit 68 using the pre-established secret key. A frame counter 94 provides varying input to the encryption unit 84 (described below) and decryption unit 70 so that the keystreams that they produce will not repeat while the secret key is in use. The decrypted soft bits are then decoded by channel decoder 72. Channel decoder 72 generates decoded speech bits and an error indication E that is used by the vocoder 74 to invoke APR. Vocoder 74 converts the speech bits to standard u-law or A-law companded PCM at 56 KB/s or 64 KB/s for transmission over the PSTN. More recently, there have been moves in the industry to transport the decoded speech bits over the Internet, which provides lower transport costs per bit. Accordingly, network interface 76 may include a reformatter (not shown) to format output from the vocoder 74 for transmission over the Internet or other IP voice network.

In the reverse direction, digital speech signals received from the fixed network via network interface 76 are transcoded by vocoder 80. Transcoding may comprise first decompanding u-law or A-law companded PCM to obtain linear PCM. Channel encoder 82 then error codes the bits of the speech frames output from vocoder 80 for error detection and error-correction. Encryption unit 84 encrypts the error-coded speech bits using the agreed upon secret key. Encrypted bits are then formatted by burst frame formatting unit 86 which can include interleaving and addition of known synchronizing bits or symbols. Modulator 88 modulates the formatted bits onto an assigned radio carrier frequency, which are then transmitted by transmitter 90.

In the exemplary base station 60 of FIG. 2, it is not possible to perform error correction or detection without decryption first; therefore the secret key must be known to the base station 60. Thus, the onward transmission from network interface 76 over the fixed network, such as the PSTN, is no longer encrypted. The subscriber's communications are thus vulnerable to interception in the fixed network. Moreover, error correction and detection are needed to perform APR in the vocoder 74, which is important to conceal bit errors occurring during wireless transmission. Since bit errors in the fixed network are at a very low level of probability, such error concealment is generally not required for communication between two fixed-network subscribers, and only becomes important when the transmission path includes a wireless communication link.

Fixed telephone networks are in the process of making a transition from a circuit-switched mode of operation, in which an effective "pair of wires" are dedicated to each call, to a packet-switched mode of operation, in which digital voice data is formatted as data packets and transmitted over the Internet or other network using the Internet Protocol (IP) and Transmission Control Protocol (TCP), referred to collectively as TCP/IP. The transmission of speech over a digital communication network employing TCP/IP is referred to herein as IP voice.

IP voice multiplexes voice data packets with other types of data packets, such as fax and computer data packets. The packets do not take a fixed route from subscriber to subscriber during a single call. Instead, each data packet contains routing information so that any node in the network at which the data packet arrives can direct it towards an indicated destination. In TCP/IP networks, IP addresses are used for routing data packets through the network. Thus, individual data packets addressed to the same destination node may travel two different routes through the network. Persons who have Internet access via an Internet Service Provider (ISP) are usually allocated IP addresses by their ISP, which are stored in the ISP's "server." Messages addressed to an Internet subscriber use the assigned IP address and arrive at the ISP's server. The subscriber typically accesses his messages by a dial-up, local-call connection from his personal computer to the ISP's server. It may be anticipated, however, that an increasing proportion of Internet subscribers will have IP routing all the way to their personal computers and receive messages directly at their own computers by means other than dial-up connections. For example, consumers having a "live" connection, such as a Digital Subscriber Line (DSL) or cable modem, may have data packets delivered to their own computers.

When practicing IP voice telephony between two or more fixed subscribers, each in possession of a personal computer and subscription to an Internet service, it is possible to provide personal computer software that will perform end-to-end encryption. Modern personal computers include A/D and D/A converters on sound cards, and have sufficient processing power to execute vocoder algorithms, encryption/decryption algorithms, and packet formatting/deformatting algorithms. Two subscribers desirous of establishing secure communications can either use the well-known RSA public/private key encryption system or, alternatively, can establish a unique key for each call by using the Diffie-Hellman algorithm. The key obtained by use of the Diffie-Hellman exchange may then be used with any block or stream cipher.

When IP is used for routing digital voice calls and the destination subscriber has an ordinary telephone number, and not an IP address, the call is routed to a server owned by an IP voice service provider, which then dials the telephone number of the destination subscriber to complete the call. By locating such servers strategically around the country, it can be ensured that this dial-up circuit to complete the connection is never more than a low or zero-tariff local call.

Figure 3:
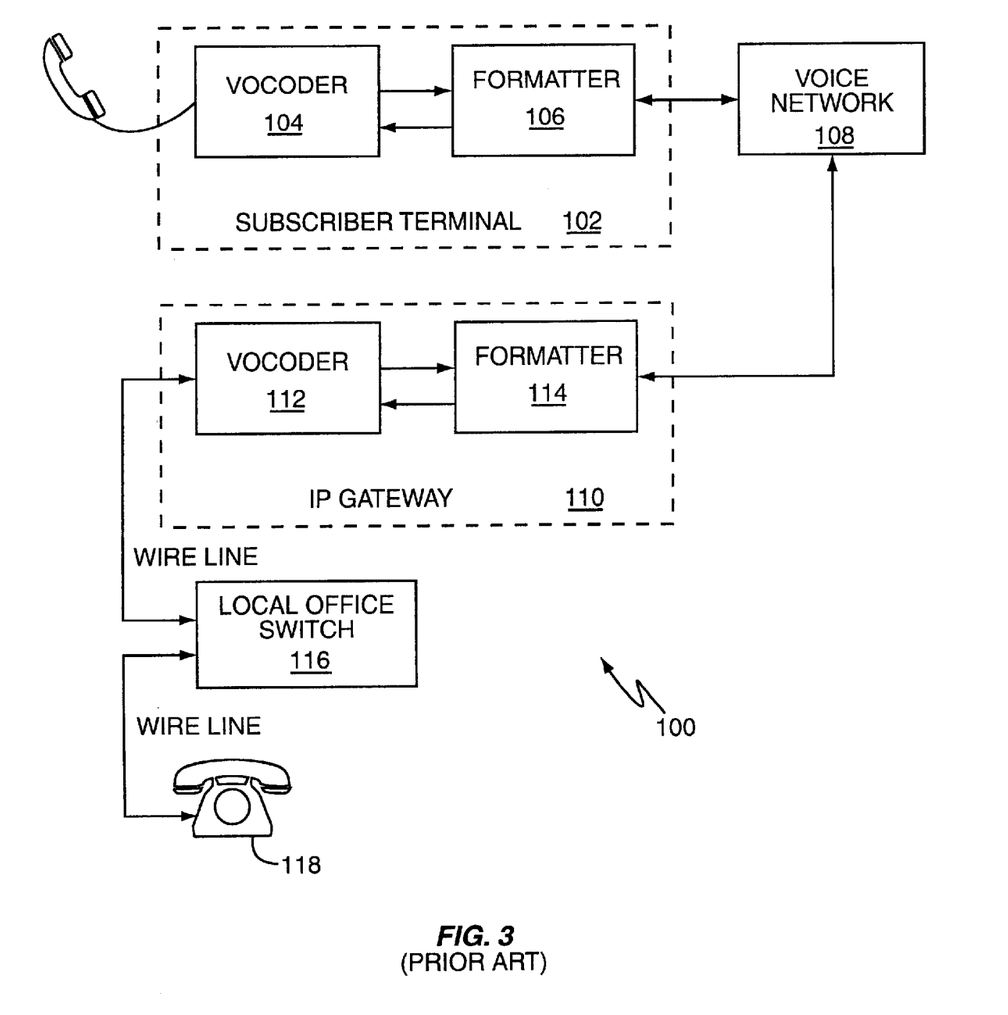
FIG. 3 is a schematic diagram of a prior art communication network for transmitting voice over the Internet.

A prior art communication system for IP voice communications is shown in FIG. 3 and is indicated by the numeral 100. The prior art communication system 100 comprises two subscriber terminals 102 and 118 respectively, IP voice network 108 (such as the Internet) connecting the subscriber terminals 102 and 118, IP voice gateway 110, and local office switch 116. Subscriber terminal 102 has digital signal processing capabilities. Subscriber terminal 102 may, for example, be a personal computer equipped with a modem and have Internet access. In contrast, subscriber terminal 118 lacks signal processing capabilities. Subscriber terminal 118 may for example be a conventional telephone.

The subscriber terminal 102 includes a vocoder 104 and formatter 106. Vocoder 104 may, for example, be implemented in software running on the subscriber terminal 102, which may be a personal computer or co-processor card within a personal computer. Vocoder bits are output to (or input from) the so-called applications layer of the software. This applications layer, which would be invoked, for example, by the user simply clicking the mouse on a "telephone" icon, would typically perform all processing peculiar to the application, including end-to-end encryption (if used), error correction coding and decoding (if used), and so on. Today, there is not a need for error correction or detection coding in IP voice terminals because the transport layer is an end-to-end bit-exact protocol. However, IP formatting must still be performed prior to transport over the IP voice network 108. This is done by the formatter 106 in the subscriber terminal 102. Formatter 106 may also be implemented in software on the subscriber terminal 102. Bits output from formatter 106 are provided to the transport layer at the subscriber terminal 102. Because the IP is a bit exact protocol, the same bits should emerge from the transport layer at the receiving terminal (which may be a second subscriber terminal 102 or IP voice gateway 110) unaltered, at least not intentionally, by transport over the IP voice network 108.

When wireless communication links are not considered, IP voice applications have no reason to employ error correction or detection coding, nor is the encryption method important. If end-to-end encryption were desired, secure protocols for IP voice networks, such as IP-SEC or HTTPS, are known. These protocols are not adapted for any particular form of traffic as the transport layer is not concerned with the type of data transported, be it voice, images, fax, text, or computer data.

The benefits of low-tariff IP voice may also be made available to subscribers having "dumb" subscriber terminals 118, such as a conventional telephone. In this case, the subscriber gains access to the IP voice network 108 by dialing the local access number of an IP voice gateway 110 that performs the same functions as the subscriber terminal 102. The subscriber terminal 118 is connected by a local office switch 116 to the IP voice gateway 110. The IP voice gateway 110 may comprise means to decode DTMF tones to receive the dialed number from the subscriber terminal 118 and to convert the dialed number to an IP address for a destination subscriber terminal 102 or another IP voice gateway 110. IP voice gateway 110 includes a vocoder 112 and formatter 114 that perform in a manner substantially identical to vocoder 104 and formatter 106 in the subscriber terminal 102.

IP voice is changing the whole business model of the telephone world away from per-minute or distance related tariff structures to flat-fee, monthly subscriptions. At the same time, there is an increasing tendency for subscribers to prefer the freedom of wireless telephones or other mobile terminals 10. The incorporation of the special needs of wireless communications into IP telephony is thus desirable. The prior art communication system 100 shown in FIG. 3, however, does not anticipate the special needs for encryption, error protection, or APR as required when the transmission path includes a wireless communication link.

When one of the subscribers is a wireless subscriber, the requirements for error correction, error detection, and APR must be taken into account. For example, as described in reference to FIGS. 1 and 2, if decryption cannot be performed in decryption unit 70 at the base station 60 due to a lack of the secret key, then the function embodied in the decryption unit 70, channel decoder 72, and vocoder 74 must be transferred to the subscriber terminal of the fixed subscriber. However, the soft bits output from the demodulator 66 comprises a multibit value for each information bit, greatly magnifying the quantity of bits to be communicated to the fixed subscriber. This increases bandwidth requirements and is, therefore, undesirable.

Therefore, extending IP voice to wireless subscribers while leaving soft error correction in place requires that the order of encryption and error correction coding be reversed. Now, error detection coding can be performed either before or after encryption. However, error correction decoding must be performed following encryption.

Figure 6:
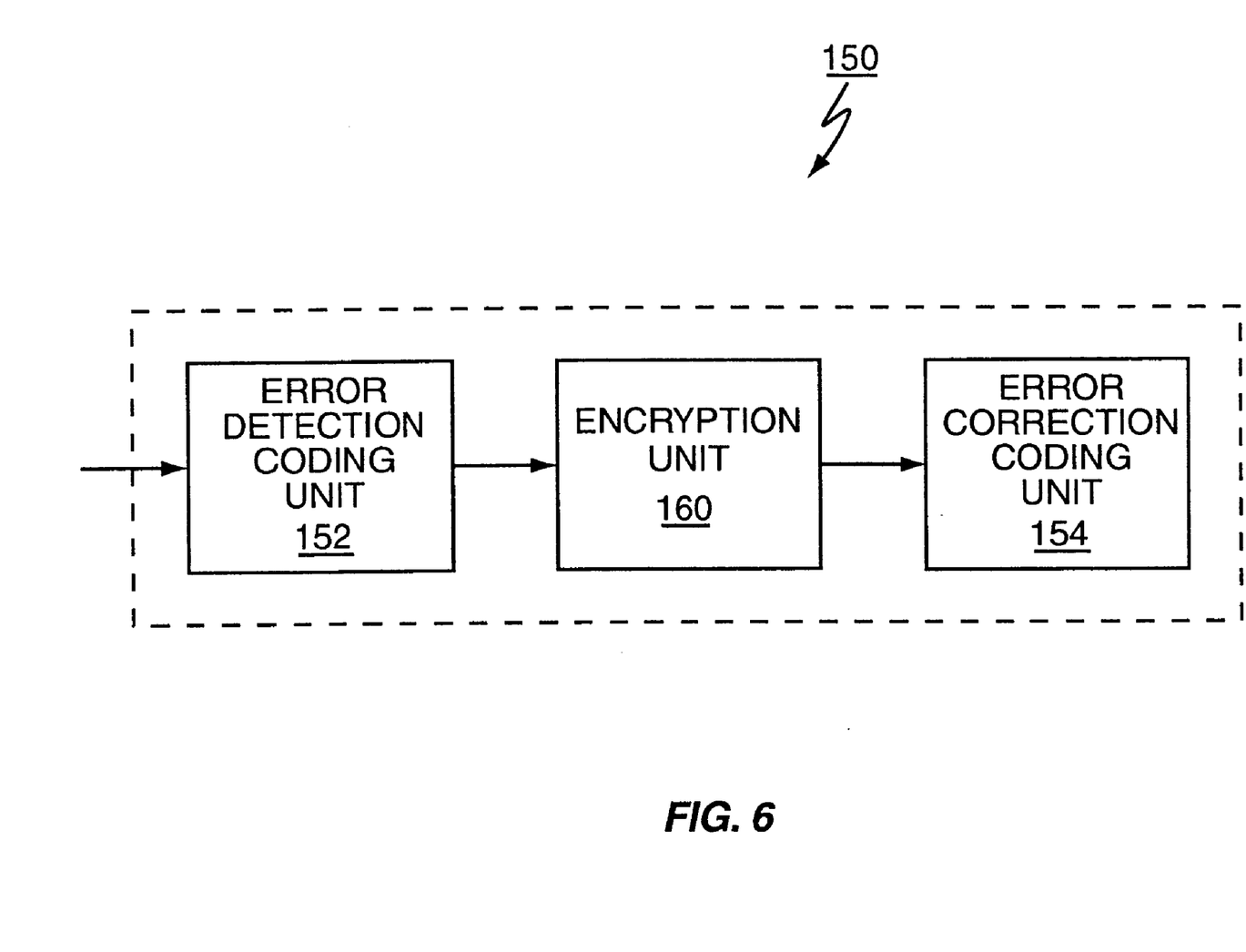
FIG. 6 is a block diagram illustrating one possible arrangement of the channel encoder and encryption unit in a transmitting terminal according to the present invention.
Figure 7:
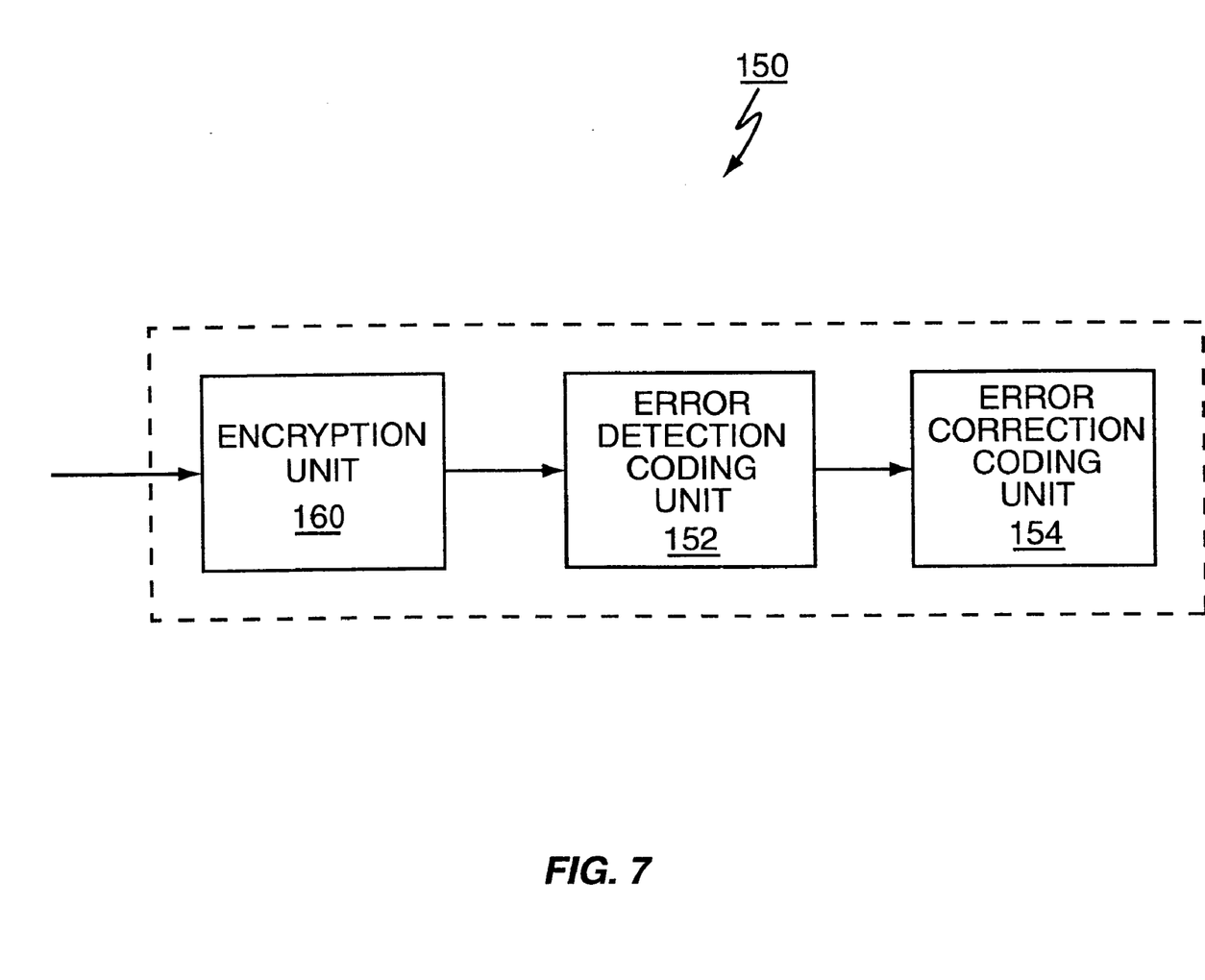
FIG. 7 is a block diagram illustrating an alternative arrangement of the channel encoder and encryption unit according to the present invention.

FIGS. 6 and 7 illustrate the two possible locations for error detection coding according to the present invention. In FIG. 6, a channel encoder 150 is divided into two components—the error detection coding unit 152 and error correction coding unit 154. Error detection coding is added in the error detection coding unit 152 to the plain text voice bits output from a vocoder (not shown) and prior to encryption. For example, error detection coding can comprise grouping the most important twelve bits of the vocoder output together, referred to as the "class I" bits, and forming an 8-bit cyclic redundancy check (CRC) code in dependence on these twelve bits. The twelve "class I" bits and the eight-bit CRC are then kept together as a twenty-bit block protected by error detection coding. Bits output from error detection coding unit 152 are encrypted in an encryption unit 160 prior to error correction coding, which is performed in error correction coding unit 154.

In FIG. 6, the error detection coding unit components 152 and error correction coding unit 154 are separated by an end-to-end encryption unit 160. The error correction decoding corresponding to error correction coding unit 154 must be performed in the network station where soft-demodulated bits are available, otherwise, a transmission overhead is incurred in conveying soft information over the Internet. Alternatively, a 2 dB loss in wireless link performance will be incurred if soft information is not used. A loss in wireless link performance is also entailed if the ability to use unequal error protection for different speech bits is restricted. For example, if the encryption unit 160 employs block encryption, the encrypted bits output from encryption unit 160 are a function of all of the input bits, so they cannot be divided into importance classes. Preserving the ability to divide vocoder bits into importance classes requires that the encryption unit 160 use bitwise encryption rather than block encryption. Alternatively, the encryption unit 160 could use class-wise block encryption, by which is meant that all bits that are to be equally error-protected shall be encrypted as a block, and bits that are to be differently error-protected shall be treated as a different block. However, as described in the above-incorporated application Ser. No. 08/943,885, ultimately each bit should be considered as having a different perceptual importance and the bits should be sorted according to this importance. Likewise, the amount of error protection afforded to different bits by even a constant-rate, error correcting code is not uniform.

With non-tail-biting convolutional codes, for example, the error protection is much greater nearer the tail bits. Accordingly, the amount of error protection afforded by the code should be evaluated by simulation for different bits during the design phase, and then bits mapped to these positions in order of importance. That is, more important bits should be located in the positions enjoying greater error protection and less important bits in positions with lower error protection. It is common for the bits of least significance not to be coded at all. In that case, block encryption of that class of bits is not desirable because an error in one bit would cause 50% error in the decrypted bits at the receiving end, magnifying the perceptual effect of the error. Thus, bitwise encryption is the preferred embodiment.

After encryption unit 160 and error-correction encoding in error correction coding unit 154, the bits are transmitted over the wireless link to the network station. The network station decodes the error correction code, but is not able to decipher the end-to-end encryption. Therefore, when the methodology and apparatus of FIG. 6 are used, the network station cannot use error detection coding to detect transmission errors that were not corrected by the error correction codes. Hence, the encrypted digital speech signal, which at this stage includes vocoder bits and error detection bits, must be transmitted to the destination subscriber where deciphering can be carried out. Only then, i.e., at the destination subscriber terminal (not shown), can the error detection code be processed to reveal the presence of transmission errors. The destination subscriber terminal must, therefore, perform error detection and, in the case that an error is detected, APR.

FIG. 6 shows at least retaining APR at the subscriber terminal, but at the disadvantage of having the overhead of error detection coding carried over the wireless communication link to the fixed network, where it is not really necessary. Moreover, error correction decoding at the network station cannot make use of the error detection coding for link quality assessment, which is useful for deciding when to hand off a mobile call to a different base station, nor can it use the error detection coding to assist the error correction coding, as described in the previously incorporated references.

In FIG. 7, channel encoder 150 includes an error detection coding unit 152 and error correction coding unit 154 as shown in FIG. 6. However, in this example, both error detection coding unit 152 and error correction coding unit 154 are performed following encryption and retained as one unit of coding that is optimized for the wireless communication link. For the same reasons as set forth above with respect to FIG. 6, bitwise encryption is preferably used so as to preserve the ability to perform unequal error protection according to the perceptual significance of different vocoder bits.

In the system shown in FIG. 7, the base station is able to perform error correction decoding and error detection without the need to decipher the encrypted digital speech signal. However, there is no way to indicate the result of error detection to the destination subscriber as there is no way to insert such an error indication into the end-to-end encrypted payload. Even if an error indication were appended in plain text, the principle that packet data transmission is an end-to-end bit exact delivery method would have to be violated, as bits would need to be received and processed by the destination terminal that were not created at the source terminal. It is also common practice that data packets may be disassembled and reassembled into packets of varying size for different segments of an end-to-end path, all the while keeping track that the correct quantity of bits originating from the source are always delivered and in the right order. Such reformatting occurs at different levels in the overall "protocol stack." It may be realized that altering the number of bits to be delivered at some intermediate point in the protocol stack can be problematic, causing confusion at other levels of the protocol stack that now do not perceive the expected number of bits, and is called a "protocol stack violation." The present invention avoids this potential protocol stack violation.

Figure 4:
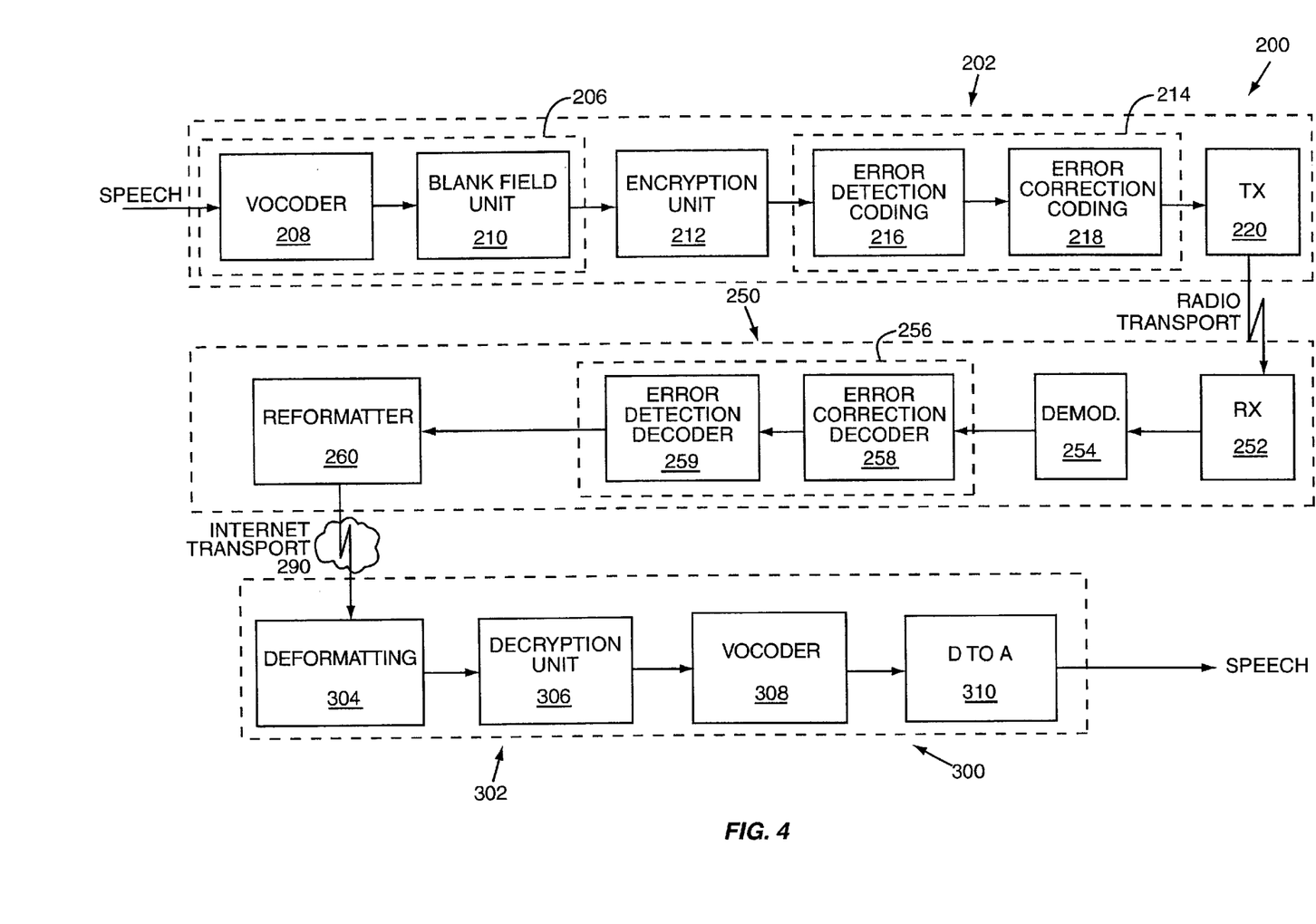
FIG. 4 is a block diagram of a communication network for voice communications originating at a mobile terminal and terminating at a fixed terminal.
Figure 5:
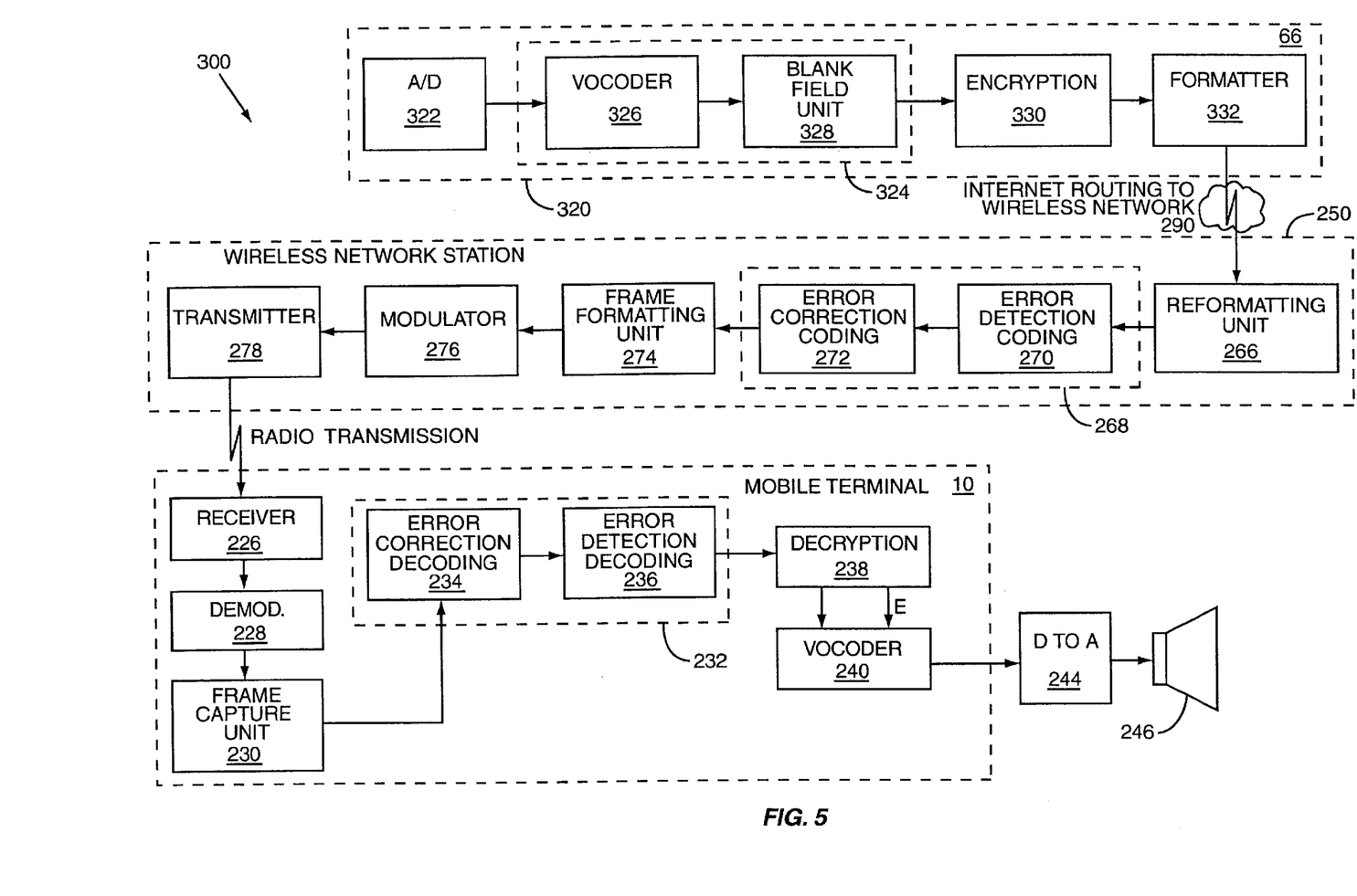
FIG. 5 is a block diagram of the communication network of FIG. 4 illustrating voice communication originating at a fixed terminal and terminating at a mobile terminal.

FIG. 4 illustrates a digital communication system 200 according to the present invention that is specially adapted for IP voice communications between two terminals where at least one of the communication links is a wireless communication link. The digital communication system 200 uses IP for transport over the fixed portion of the communication network and still allows end-to-end encryption of data. As shown in FIGS. 4 and 5, the digital communication system 200 comprises a mobile terminal 202 adapted for wireless communications, a wireless network station 250 communicating with the mobile terminal 202, a fixed network 290 (such as the Internet) using IP for voice communications, and a fixed terminal 300 connected to the fixed network.

FIG. 4 illustrates communications from the mobile terminal 202 to the fixed terminal 300. Specifically, FIG. 4 illustrates the transmit chain of the mobile terminal 202, the receive chain of the wireless network station 250, and the receive chain of the fixed terminal 300. The transmit chain of the mobile terminal 202 includes a speech coder 206, encryption unit 212, channel coder 214, and transmitter 220.

A digitized speech signal is input to speech coder 206, which comprises a vocoder 208 and blank field unit 210. The mobile terminal 202 may also include an A/D converter (not shown) to generate the digitized speech signal from an analog voice signal. Vocoder 208 produces a speech frame comprising coded speech bits, also called vocoder bits, to which is added an error indication field in blank field unit 210. The error indication field may comprise one or more bits that simply serve as a placeholder for error indication bits as will be hereinafter described. The error indication field can, in its simplest form, comprise the addition of one extra unused bit to the most important class-I bits produced by the vocoder 208. This initially blank error indication field will be used to collect error indications along the speech frame's transmission path without altering the total number of bits transported end-to-end. The function of the blank field unit 210 may be incorporated into vocoder 208. The values initially inserted into the error indication field by the vocoder 208 or blank field unit 210 may be initially indicative of no error.

The speech frame output from speech coder 206 comprises both a speech data field and an error indication field. The speech frame is input to encryption unit 212. To allow access to alter the contents of the error indication bits (i.e., bits in the error indication field) in the digital communication system 200, the error indication bits are encrypted independently of the speech bits (i.e., bits in the speech data field). For example, by treating the error indication bits as a different plain text block than the speech bits, if block encryption is used; by performing a null-encryption of the error indication bits; or by using bitwise encryption that encrypts each speech bit and error indication bit independently by exclusive-ORing a corresponding keystream bit. Then, it is possible to invert any bit of the error indication field (or in the speech data field) in the digital communication system 200 without needing access to the secret key.

Encrypted bits output from encryption unit 212 are input to channel coder 214, which includes error detection coding unit 216 and error correction coding unit 218. Error detection coding unit 216 error codes the encrypted bits, using an error detection code as previously described. Error correction coding unit 218 then performs additional error coding using an error correction code. It should be noted that the order of encryption and error coding in the present invention is reversed as compared to the prior art method illustrated in FIG. 1. As will become apparent from the following description, reversing the order of encryption and error coding enables decoding to be performed at the wireless network station 250.

Bits output by the channel coder 214, referred to herein as coded bits, are formatted and then modulated onto a carrier by transmitter 220 for transmission to the wireless network station 250. Formatting includes adding training and synchronization bits and interleaving the bits to minimize errors caused by deep fading.

The signal transmitted from the mobile terminal 202 is received by the wireless network station 250, which may, for example, be a base station in a mobile communication network. Wireless network station functions as a forwarding terminal to forward messages between first and second terminals where at lest one of the first and second terminals is a mobile terminal 202. Wireless network station 250 comprises a receive chain to handle communications originating at the mobile terminal 202 and a transmit chain to handle communication originating in the fixed network 290. The receive chain of the wireless network station 250 comprises a receiver 252, demodulator 254, channel decoder 256, and reformatter 260. The received signal is filtered and amplified by receiver 252. Receiver 252 may be one of a number of available receivers 252. Demodulator 254 demodulates the received signal and outputs demodulated soft bits, referred to as the received bits, to the channel decoder 256 as previously described. Channel decoder 256 includes an error correction decoder 258 and error detection decoder 259. It should be noted that the order of error decoding and decryption in the network station is reversed as compared with the prior art shown in to FIG. 2. Channel decoder 256 decodes the received bits to recover the encrypted speech bits and encrypted error indication bits. In the present invention, error decoding is possible without decryption because error coding is performed on the encrypted bits. Consequently, the wireless network station 250 can strip off the overhead of error detection, i.e., the exemplary eight CRC bits referred to earlier, and compute therefrom an error indication E, which in the given example may only be a single bit. The error indication E may then be exclusive-ORed with the error decoded (but perhaps still encrypted) error indication field, which, when bitwise encryption is used, results merely in inverting the data in the error indication field when an error is detected. Assuming that a "0" represents no error, the error bit in the error indication field will be changed to a "1" when an error is detected. Thus, channel decoder 256 can change the bits in the error indication field from the initial "no error" indication to an "error" indication without decryption. The decoded bits are assembled into a string by the channel decoder 256 with the encrypted speech bits in the speech data field and the error indication bits in the error indication field. The decoded (but still encrypted) speech bits and error indication bits produced by channel decoder 256 are reformatted in reformatter 260 for transmission over the IP voice network 290.

Following transmission over the IP voice network 290, the fixed terminal 300 of the destination subscriber terminates the Internet Protocol. The fixed terminal 300 comprises a receive chain 302 for receiving communications from an originating terminal (which may be a mobile terminal or another fixed terminal) and a transmit chain 320 (FIG. 5) for communications that originate at the fixed terminal 300. The receive chain 302 includes a deformatting unit 304 to remove IP formatting and to reassemble the encrypted speech frames, which include both the speech data field and error indication field. Decryption unit 306 deciphers the speech frames to reveal plain text speech bits and the error indication E inserted by the wireless network station 250. The error indication E is used by vocoder 308 to control APR to reduce the perceptual impact of wireless transmission errors on voice quality. Vocoder 308 transcodes the speech bits to PCM. After transcoding to PCM in vocoder 308, the PCM speech is converted to an analog voice signal in D/A converter 310 and output as speech to the telephone earpiece or loudspeaker.

Persons skilled in the art will realize that the function of deformatting unit 304 to terminate the Internet Protocol and reformat the received bits into encrypted speech frames can involve processing and reformatting information through many layers of a complex protocol stack. Each layer may include its own headers, CRC-checks, bit or byte counts, and so on, the details of which are determined by the details of the end-to-end protocol defined by the vocoder 208, blank field unit 210, and encryption unit 212. Also included is any formatting (not explicitly shown) that is defined for mobile IP voice that may occur either before or after channel coding, plus the protocol stacks terminated or added by the reformatter 260 at the wireless network station 250, all of which protocol stacks are not material to the invention as they cancel each other out. The end result of reformatting and decryption should produce at the input of the receiving vocoder 308 the bits that were output by the vocoder 208 at the sending end, give or take the uncorrected errors introduced by the wireless communication link and the manipulation of the error indication field to indicate such errors.

FIG. 5 shows the reverse direction of voice processing for communications from the fixed terminal 300 to the mobile terminal 202. FIG. 5 illustrates the transmit chain 320 of the fixed terminal 300, the transmit chain of the wireless network station 250, and the receive chain of the mobile terminal 202.

The transmit chain 320 of the fixed terminal 300 comprises an A/D converter 322, speech coder 324, encryption unit 330, and frame formatter 332. Fixed terminal 300 may be personal computer, or an IP voice gateway as shown in FIG. 3. In either case, plain text voice is initially received by an input including a microphone (not shown) and the A/D converter 322 and then transcoded from linear PCM to the chosen format for IP voice communications by speech coder 324. Speech coder 324 includes a vocoder 326 and a blank field unit 328. Vocoder 326 produces frames of speech bits and blank field unit 328 appends an error indication field as previously described. The speech frames with the appended error indication field are encrypted by encryption unit 330, which preferably uses bitwise encryption. The encrypted speech frames are then formatted by frame formatter 332 for transmission over the IP voice network 290. Those skilled in the art will recognize that formatting may involve many layers of protocol stacks that are not material to the invention.

The signal from the fixed terminal 300 is routed over the IP voice network 290 to the wireless network station 250, which may terminate the Internet Protocol. The transmit chain of the wireless network station 250, which handles communications terminating at the mobile terminal 202, comprises a reformatting unit 266, channel encoder 268, and transmitter 278. Reformatting unit 266 reformats speech frames received from the fixed terminal 300 for transmission over the wireless communication link to the mobile terminal 202. Reformatting the received data for wireless transmission may include assembling the speech bits into different sized packets for transmitting over the wireless communication link. The wireless communication link also requires suitable error detection and error correction coding provided by a channel encoder 268. Channel encoder 268 comprises an error detection coding unit 270 and error correction coding unit 272. Frame formatting unit 274 sorts the bits into appropriate frames for transmission over the wireless communication link as previously described. The formatted bits are then modulated by modulator 276 onto an assigned carrier for transmission by transmitter 278.

The digitally-encoded speech signal transmitted from the wireless network station 250 is received by the mobile terminal 202. The receive chain of the mobile terminal 202 comprises a receiver 226, demodulator 228, frame capture unit 230, channel decoder 232, decryption unit 238, vocoder 240, and D/A converter 244. Receiver 226 receives, amplifies, and filters the received signal. The received signal is then converted to numerical form for baseband processing by demodulator 228 and frame capture unit 230. Demodulator 228 produces soft bits that are decoded by channel decoder 232 to detect and/or correct any errors that may have occurred. Channel decoder 232 comprises an error correction decoder 234 and an error detection decoder 236.

The output of channel decoder 232 is a reproduction of the encrypted speech frames, excepting the possible changes in the error indication field to indicate uncorrected errors, at least in the most important class-I bits of the speech frame. The error indication E is bitwise combined with the bits in the error indication field. The encrypted bits are decrypted by decryption unit 238 to recover the speech bits and error indication E. The decrypted speech bits and error indication E are then input to vocoder 240 which uses the error indication E to perform APR. After APR, D/A converter 244 reproduces the analog speech signal which is transduced by a speaker to reproduce the original speech.

The transmission of speech frames from transmitting vocoder 326 in the fixed terminal 300 to receiving vocoder 240 in the mobile terminal 202 may comprise several layers of formatting and reformatting according to protocol stacks not shown. Such protocol stacks may perform their own sum checks, bit or byte counts on the integrity of the data and hence may be described as "bit exact" protocols. Outputting a quantity of bits from the radio-layer error decoding that did not match the number of bits into the radio layer encoding could confuse such bit exact protocols. This is avoided by the inclusion of the error indication field, which serves as a placeholder for the error indication E and anticipates the need to output the additional error indication E from channel decoder 232 that is not present in the prior art. Thus, the error indication E may be inserted into the error indication field without altering the total number of bits or bytes originally created at the sending terminal.

In a public communications network increasingly comprising mobile or wireless subscribers as well as conventional fixed subscribers, and especially taking into account the availability of features such as call forwarding, it becomes increasingly difficult to predict whether any given call to a particular person will be answered from a fixed terminal or a mobile terminal. It is desirable therefore that the protocol for IP voice adopted for all cases be suitable for the case where calls are originated or terminated at a mobile terminal. The cases of fixed origination, mobile termination and vice-versa have already been discussed above. The final case of mobile origination and termination suggests a final refinement to account for the presence of two wireless communication links, each having the possibility to generate frame error indications. If each error indication is combined modulo-2 with the same bit of the (original) error indication field, a double error indication would cancel out. This could be prevented by ORing the error indications E, but this is only possible if the error indication field is not encrypted. The encryption masks the polarity of the first error indication so that it is not possible to perform a logical OR operation with the second error indication. This problem is avoided if the error indication field is provided with at least two separate bits for each class of error that can arise. In the case of a single class of error being defined, the error indication field need only comprise two bits. However, if, as disclosed in the incorporated material, errors can be detected separately in different ones of the speech parameters, and it is desired to indicate which speech parameters have been corrupted or not by transmission errors, then two bits of error indication field should be provided for each parameter that can have an error indication. In the simplest case of just flagging the whole speech frame to be right or wrong, two bits would be provided, and the first wireless communication link would XOR its error indication, with a first bit of the error indication field while the second wireless communication link would XOR its error indication, with the second bit of the error indication field. That is, error detection decoder 259 in the wireless network station 250 would always XOR its error indication E with a first predetermined bit position in the error indication field while an error detection decoder 236 in a mobile terminal 202 would XOR its error indication with a second predetermined bit of the error indication field. After decryption (if used) to reveal the two error indications in their correct polarity, the indications could be ORed to produce a joint error indication indicative of either no error, or alternatively indicating that an error occurred on at least one of the two radio paths.

The error indication field can of course be used to convey more comprehensive forms of error indication, as well as link status indicators, tariff warnings, indications of whether encryption is in use end-to-end, or only to a gateway, or even data such as the current location of the mobile subscriber answering the call, if such information is permitted by the mobile subscriber to be disclosed. These uses of the error indication field permit information to be added at different points in the protocol stack without violating the bit-count integrity of the end-to-end protocol layer.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for transmitting telephone messages over the Internet between a first subscriber using a mobile terminal and a second subscriber, comprising:

digitizing speech in a first vocoder to be transmitted from said first subscriber to said second subscriber;

coding and formatting said digitized speech for wireless transmission to obtain coded and formatted digitized speech;

receiving said coded and formatted digitized speech at a wireless receiver;

decoding said coded and formatted digitized speech to obtain decoded speech and an error indication;

combining said error indication with said decoded speech and reformatting the decoded speech plus error indication for transmission over the Internet to a second vocoder;

deformatting said decoded speech plus error indication and applying the deformatted speech and error indication to the second vocoder to convert the decoded speech to an analog voice signal for said second subscriber, wherein said second vocoder uses said error indication to mask errors arising during said wireless transmission.

2. The method of claim 1 wherein coding said digitized speech comprises encryption using a secret key followed by error detection coding.

3. The method of claim 2 wherein coding said digitized speech further comprises error correction coding.

4. The method of claim 1 wherein decoding said coded and formatted digitized speech comprises error detection decoding.

5. The method of claim 4 wherein decoding said coded and formatted digitized speech comprises error correction decoding prior to said error detection decoding.

6. The method of claim 1 further comprising appending to said digitized speech at least one unused bit to each of a predetermined number of digital speech bits with said first vocoder.

7. The method of claim 6 wherein combining of said error indication with said decoded speech comprises combining said error indication with said at least one unused bit.

8. The method of claim 1 wherein combining said error indication with said decoded speech leaves unchanged a total number of bits associated with said decoded speech.

9. The method of claim 1 wherein formatting and deformatting preserves an identical number of bits from an input of said formatting to an output of said deformatting.

10. The method of claim 9 further comprising verifying that a number of deformatted bits agrees with a number of formatted bits with a bit counter.

11. The method of claim 9 further comprising verifying that a number of deformatted bytes agrees with a number of formatted bytes with a byte counter.

12. The method of claim 1 further comprising locating said second vocoder at an Internet telephony terminal used by said second subscriber.

13. The method of claim 12 further comprising implementing said second vocoder by software running on a personal computer.

14. The method of claim 1 wherein deformatting comprises deciphering the decoded speech plus error indication prior to inputting said speech and error indication to said second vocoder.

15. The method of claim 1 further comprising locating said second vocoder in an Internet telephony gateway associated with an Internet telephony service provider with whom said second subscriber has a subscription.

16. The method of claim 1 further comprising locating said second vocoder in an Internet telephony gateway associated with an Internet telephony service provider accessed via a dial-up line by said second subscriber.

17. The method of claim 1 wherein said second subscriber is also a wireless subscriber.

18. The method of claim 1 further comprising appending a blank field to said digitized speech, said blank field for holding the error indication.

19. The method of claim 18 further comprising encrypting said digitized speech and separately encrypting said blank field.

20. The method of claim 1 further comprising block enciphering a first class of speech bits separately from a second class of speech bits.

21. The method of claim 20 wherein coding and formatting said digitized speech comprises error correction coding said first class of speech bits.

22. The method of claim 21 wherein said error correction coding occurs subsequent to said enciphering.

23. The method of claim 20 wherein enciphering a second class of speech bits comprises bitwise enciphering a second class of speech bits.

24. A method for transmitting telephone messages over the Internet between a first subscriber using a mobile terminal and a second subscriber, comprising:

digitizing speech to be transmitted from said second subscriber to said first subscriber using a first vocoder adapted to a data rate used over a wireless path and formatting said digitized speech for transmission via the Internet;

receiving said speech via the Internet at a wireless network station and coding and reformatting said digitized speech for wireless transmission over a wireless network;

receiving said coded and reformatted digitized speech using a receiver in said mobile terminal and decoding said coded and reformatted digitized speech to obtain decoded speech and an error indication;

combining said error indication with said decoded speech and deformatting the decoded speech and the error indication to obtain speech frames for input to a second vocoder;

using said second vocoder to convert said decoded speech to analog speech signals, including using said error indication to mask errors arising during wireless transmission.

25. The method of claim 24 wherein said first vocoder resides in an Internet Telephony terminal used by said second subscriber.

26. The method of claim 24 wherein said first vocoder resides in an Internet Telephony gateway associated with an Internet Telephony service provider with whom said second subscriber has a subscription.

27. The method of claim 24 wherein said first vocoder resides in an Internet Telephony gateway accessed by said second subscriber via a dial-up line.

28. The method of claim 24 wherein formatting said digitized speech for transmission comprises encrypting said digitized speech using a secret key.

29. The method of claim 24 further comprising producing with said first vocoder digitized speech bits including at least one unused bit for each of a predetermined number of bits representing speech.

30. The method of claim 29 in which digitized speech bits are enciphered using a secret key independently from said at least one unused bit.

31. The method of claim 24 wherein coding of digitized speech for transmission over the wireless network comprises error detection coding.

32. The method of claim 31 in which said error detection coding is applied after enciphering said digitized speech using a cipher key.

33. The method of claim 31 wherein coding of digitized speech further comprises error correction coding.

34. The method of claim 24 wherein combining said error indication with said decoded speech leaves a total number of bits associated with said decoded speech excluding the error indication unchanged.

35. The method of claim 24 wherein combining said error indication with said decoded speech comprises combining said error indication with said at least one unused bit.

36. The method of claim 24 wherein formatting and deformatting preserves a same number of bits from an input of said formatting to an output of said deformatting.

37. The method of claim 36 further comprising verifying with a bit counter that a number of deformatted bits is in agreement with a number of formatted bits.

38. The method of claim 36 further comprising verifying on a byte counter that a number of bytes is in agreement with a number of formatted bytes.

39. The method of claim 24 wherein deformatting comprises deciphering the decoded speech plus error indication prior to inputting said speech and error indication to said second vocoder.

40. The method of claim 24 further comprising locating said second vocoder inside said mobile terminal.

41. The method of claim 24 wherein said second subscriber is also a wireless subscriber.

42. A method for transmitting telephone messages via the Internet between a first subscriber and a second subscriber using a first mobile terminal and a second mobile terminal respectively, comprising:

digitizing speech to be transmitted from one of said subscribers to the other of said subscribers using a first vocoder adapted to a data rate used over a wireless path and formatting and coding said digitized speech for wireless transmission;

receiving said coded and formatted speech at a first wireless network station, decoding said coded speech to obtain decoded speech and a first error indication, and reformatting said digitized speech and first error indication for transmission via the Internet;

receiving said reformatted digitized speech and error indication via the Internet at a second wireless network station and recoding the digitized speech and first error indication for wireless transmission from the second wireless network station to said other subscriber;

receiving said recoded speech and first error indication at said other subscriber and decoding said recoded speech to decode the recoded speech and first error indication to produce a second error indication;

combining said decoded first and second error indications with said decoded speech and deformatting the combined decoded speech plus first and second error indications to obtain speech frames for input to a second vocoder;

using said second vocoder to convert said decoded speech to analog speech signals, including using said first and second error indications to mask errors arising during wireless transmission from said one of said subscribers to said first wireless network station or arising during transmission from said second wireless network station to said other subscriber.

43. The method of claim 42 wherein coding comprises encryption using a secret key followed by error detection coding.

44. The method of claim 43 further including error correction coding.

45. The method of claim 42 wherein said first vocoder produces at least two unused output bits for each predetermined number of output bits representing speech.

46. The method of claim 45 wherein said digitized speech is enciphered independently of said at least two unused bits.

47. The method of claim 42 wherein reformatting of said decoded speech and said first error indication comprises combining said first error indication with a decoded bit corresponding to a first of said at least two unused bits.

48. The method of claim 45 wherein combining of said second error indication with said decoded first error indication and decoded speech comprises combining said second error indication with a decoded bit corresponding to a second of said at least two unused bits.

49. The method of claim 42 wherein deformatting includes deciphering said decoded speech plus said first and second error indications using a secret key.

50. A method of transmitting digitized speech containing a plurality of speech bits from a first terminal to a second terminal, said method comprising:

appending one or more error indication bits to said speech bits;

encrypting said speech bits to obtain encrypted speech bits;

encrypting said error indication bits independently of said speech bits to obtain encrypted error indication bits;

error coding said encrypted speech bits and said encrypted error indication bits to obtain coded bits; and transmitting said coded bits from said first terminal to said second terminal.

51. The method of claim 50 wherein encrypting said error indication bits independently of said speech bits comprises encrypting said error indication bits as a block separate from said speech bits.

52. The method of claim 50 wherein encrypting said error indication bits independently of said speech bits comprises encrypting said speech bits and error indication bits separately by bitwise encryption.

53. The method of claim 50 further comprising error decoding said coded bits at a third terminal disposed in the transmission path between said first and second termninals, and, if an error is detected, modifying said error indication bits without altering the total number of coded bits.

54. The method of claim 53 wherein modifying said error indication bits is performed without deciphering said encrypted error indication bits.

55. The method of claim 53 further comprising:

transmitting said encrypted speech bits and said encrypted error indication bits as modified by said third terminal to said second terminal;

deciphering said encrypted speech bits and said encrypted error indication bits at said second terminal to obtain said speech bits and said error indication bits respectively; and speech decoding said speech bits using said error indication bits to mask errors arising during transmission.

56. The method of claim 55 wherein speech decoding said speech bits comprises using said error indication bits to invoke an artificial parameter reconstruction algorithm.

* * * * *